United States Patent [19]

Naoe

[11] Patent Number: 5,506,965

[45] Date of Patent: Apr. 9, 1996

[54] MICROCOMPUTER INCORPORATING COMMUNICATION DEVICE

[75] Inventor: Yukihisa Naoe, Hyogo, Japan

[73] Assignee: Mitsubishi Denki Kabushiki Kaisha, Tokyo, Japan

[21] Appl. No.: 432,333

[22] Filed: May 1, 1995

Related U.S. Application Data

[63] Continuation of Ser. No. 913,267, Jul. 14, 1992, abandoned.

[30] Foreign Application Priority Data

Jul. 16, 1991 [JP] Japan .................... 3-201431

[51] Int. Cl.$^6$ .............................. H04J 3/02; G06F 13/38
[52] U.S. Cl. .................... 395/200.17; 395/200.2; 395/834; 370/110.01; 370/31; 364/DIG. 2; 364/240.9; 364/240; 364/239.1; 364/239
[58] Field of Search ................. 370/13, 31, 30, 370/60, 94, 24; 379/98, 110.01; 364/132, 514; 395/200.19, 200.2, 200.17, 834, 275

[56] References Cited

U.S. PATENT DOCUMENTS

| | | | |
|---|---|---|---|
| 4,622,551 | 11/1986 | Kupersmith et al. | 340/825.06 |
| 4,796,256 | 1/1989 | Opderbeck | 370/110.1 |
| 4,924,456 | 5/1990 | Maxwell | 370/32 |
| 5,121,382 | 6/1992 | Yang et al. | 370/31 |

OTHER PUBLICATIONS

*Microprocessor and Peripheral Handbook*, INTEL Corporation 1983.

*Primary Examiner*—Alyssa H. Bowler
*Assistant Examiner*—L. Donaghue
*Attorney, Agent, or Firm*—Townsend and Townsend and Crew

[57] ABSTRACT

A slave mode/master mode switching flag, a switch 19, and a start bit 0/1 generator 20 are provided in a two-way communication device 1 incorporated in a microcomputer. In a slave mode, data transmission and reception are synchronized with a start bit over a communication line, and the communication device does not output a start bit for transmission. In a master mode, data transmission is synchronized with a start bit outputted from the communication device, and data reception is synchronized with a start bit over the communication line. The communication device outputs a start bit for communication data. Two-wire two-way serial communication is effected by combining microcomputers set at a master mode. Single-wire two-way serial communication is effected by combining a microcomputer set at a master mode and another microcomputer set at a slave mode.

6 Claims, 13 Drawing Sheets

FIG. 3

| | | GENERATION OF START BIT | SYNCHRONIZATION OF DATA BIT |
|---|---|---|---|
| SLAVE MODE | TRANSMISSION | INPUT FROM PARTNER DEVICE | SYNCHRONIZED WITH START BIT OF PARTNER DEVICE |
| | RECEPTION | INPUT FROM PARTNER DEVICE | SYNCHRONIZED WITH START BIT OF PARTNER DEVICE |
| MASTER MODE | TRANSMISSION | OUTPUT FROM PRESENT DEVICE | SYNCHRONIZED WITH START BIT OF PRESENT DEVICE |
| | RECEPTION | INPUT FROM PARTNER DEVICE | SYNCHRONIZED WITH START BIT OF PARTNER DEVICE |

MICROCOMPUTER INCORPORATING COMMUNICATION DEVICE

This is a continuation of application Ser. No. 07/913,267, filed Jul. 14, 1992 now abandoned.

BACKGROUND OF THE INVENTION

1. Field of the Invention

The present invention relates to a microcomputer incorporating a communication device capable of switching between two-wire two-way serial communication (two-wire full-duplex communication; UART) and single-wire two-way serial communication (single-wire half-duplex communication).

2. Description of the Prior Art

FIG. 12 is a block diagram of a conventional two-way communication device built in a microcomputer. In the figure, reference numeral 50 represents a two-way communication device, 2 a communication input terminal (R×D), 3 a communication output terminal (T×D), 4 a data bus terminal for communicating transmission and reception data with an external CPU, 5 a data bus in the device connected to this data bus terminal, 6 a reception shift register for storing communication input data inputted from the communication input terminal 2, 7 a reception buffer register for transferring data having a fixed number of bits stored in the reception shift register 6 to the data bus 5, 8 a transmission shift register for sending communication output data outputted to the communication output terminal 3, 9 a transmission buffer register for transferring data from the data bus 5 to the transmission shift register 8, 10 a baud rate generator for generating basic transmission and reception timings, 11 a reception clock control circuit for generating a reception clock as the basis of shift timing of the reception shift register 6 to control the reception shift register 6, 12 a divider for dividing the reception clock (into ¹⁄₁₆, for example) generated by the reception clock control circuit 11 to generate the shift timing of the reception shift register 6, 13 a transmission clock control circuit for generating a transmission clock as the basis of shift timing of the transmission shift register 8 to control the transmission shift register 8, 14 a divider for dividing the transmission clock (into ¹⁄₁₆, for example) generated by the transmission clock control circuit 13 to generate the shift timing of the transmission shift register 8, and 15 a reception permission flag for starting the monitoring of a start bit of the communication input data by a start bit detector 17, which is set from the data bus 5 by the external CPU. Reference numeral 16 represents a transmission permission flag for permitting the operation of the transmission clock control circuit 13, which is also set from the data bus 5. Denoted at 17 is a circuit for detecting the start bit of the communication input data of the communication input terminal 2, which activates the reception clock control circuit 11. Numeral 18 is a circuit for generating a start bit of the transmission shift register 8, which constantly sets the logic of the start bit at "Low".

The operation of the two-way communication device will be described hereafter. For two-way communication using a conventional two-way communication device 50, two two-way communication devices (communication devices 40 and 41) are connected with each other as shown in FIG. 13. In other words, the communication output terminal 3 of the device 40 is connected to the communication input terminal 2 of the device 41, and the communication output terminal 3 of the device 41 is connected to the communication input terminal 2 of the device 41. For two-way communication, communication data DATA-A1, DATA-A2 and DATA-A3 are transmitted from the device 40 to the device 41 at predetermined intervals and communication data DATA-B1, DATA-B2 and DATA-B3 are transmitted from the device 41 to the device 40 at predetermined intervals.

In this case, the first data are preset in the transmission buffer register 9 through the data bus 5, and the transmission request flag 16 and the reception permission flag 15 are set through the data bus 5 in each of the communication devices 40 and 41.

The set transmission request flag 16 enables the transmission clock control circuit 13 to operate and transfers data stored in the transmission buffer register 9 to the transmission shift register 8. The set transmission request flag 16 provides a clock generated by the baud rate generator 10 to the transmission clock divider 15 and the start bit generator 18. The start bit generator 18 sets the communication output terminal 3 at the "Low" level during a predetermined period of time. Thereafter, the transmission clock divider 14 generates a shift clock to the transmission shift register 8 and outputs the first transmission data to the communication output terminal 3.

Since the conventional two-way communication device is structured as described above, a two-wire two-way serial communication system or a single-wire two-way serial communication system is fixedly set in the device according to the user's specifications. Therefore, even if the user's specifications changed, the communication system could not be altered. In addition, the wiring costs of communication lines were high, and the circuit complicated.

SUMMARY OF THE INVENTION

The present invention has been worked out to solve the above problems, and it is therefore an object of the present invention to provide a microcomputer incorporating a communication device which can switch between a two-wire two-way serial communication system and a single-wire two-way serial communication system with simple built-in hardware, simplify the internal circuit thereof, and reduce the wiring costs of communication lines.

As shown in FIG. 1, the microcomputer incorporating the communication device according to the first invention comprises the start bit generator (start bit 0/1 generator 20) for adding a start bit to communication output data outputted to the communication output terminal 3 or prohibiting it, switching means (switch 19) for connecting or disconnecting the start bit detector 17 and the transmission control circuit (transmission clock control circuit 13), and slave/master switch setting means (slave/master switching flag 21) for setting the above-mentioned start bit generator and above-mentioned switching means according to a master mode or a slave mode specified by an unshown CPU.

Furthermore, in the microcomputer incorporating the communication device according to the second invention, as shown in FIG. 9, the aforementioned communication output terminal is made an open collector type output, or is connected to a power source within the communication device (two-way communication device 1) by a resistor (pull-up resistor 25).

Moreover, in the microcomputer incorporating the communication device according to the third invention, as shown in FIG. 10, the aforementioned communication input terminal and the aforementioned communication output terminal are connected to each other in the above-mentioned communication device, and a communication input/output terminal 31, which has both the functions of the above-mentioned communication input terminal and the above-mentioned communication output terminal, is provided in the above-mentioned communication device.

In addition, in the microcomputer incorporating the communication device according to the fourth invention, as shown in FIG. 11, a CPU 40 for controlling the above-mentioned switching means and the above-mentioned slave/master switch setting means is connected to the data bus 5 within the above-mentioned communication device.

In the microcomputer incorporating the communication device according to the first invention, the CPU connected to the external data bus prohibits the above-mentioned start bit detector from the control operation of the transmission control circuit and permits the above-mentioned start bit detector to perform the control operation of the reception control circuit, and permits the above-mentioned start bit generator to generate a start bit when the above-mentioned slave/master switching flag is set at a master mode. On the other hand, the CPU permits the above-mentioned start bit detector to perform the control operation of the transmission control circuit and the reception control circuit, and prohibits the above-mentioned start bit generator from generating a start bit to the above-mentioned communication output terminal when the aforementioned slave/master switching flag is set at a slave mode. As a result, in a slave mode, the transmission of communication output data and the reception of communication input data are synchronized with the above-mentioned start bit, while, in a master mode, the transmission of communication output data is synchronized with the start bit of the present communication device, and the reception of communication input data is synchronized with the above-mentioned start bit. Either two-wire two-way serial communication or single-wire two-way serial communication is made possible by combining microcomputers set at a slave mode or a master mode. In this case, when one microcomputer is set at a master mode and the other microcomputer also at a master mode, two-wire two-way serial communication is effected, while when one microcomputer is set at a master mode and the other at a slave mode, single-wire two-way serial communication is effected.

Furthermore, in the microcomputer incorporating the communication device according to the second invention, the above-mentioned communication output terminal is made an open collector type output terminal, or is connected to a power source within the above-mentioned communication device by the pull-up resistor, whereby the terminal does not need to be connected to a power source outside the communication device by the communication line through the pull-up resistor.

Moreover, in the microcomputer incorporating the communication device according to the third invention, a single communication input/output terminal is provided in the above-mentioned communication device, and the communication input terminal and the communication output terminal are connected to this communication input/output terminal so that communication data is transmitted and received with an external communication device by means of the above-mentioned input/output terminal only.

Moreover, in the microcomputer incorporating the communication device according to the fourth invention, a CPU is incorporated in the communication device to operate the microcomputer as a one-chip microcomputer.

The above and other objects, features and advantages of the invention will be become more apparent from the following description when taken in conjunction with the accompanying drawings.

BRIEF DESCRIPTION OF THE DRAWINGS

FIG. 3 illustrates the operation of the two-way communication device of FIG. 1 for two-wire two-way serial communication and single-wire two-way serial communication;

DESCRIPTION OF THE PREFERRED EMBODIMENT

Figure 1:
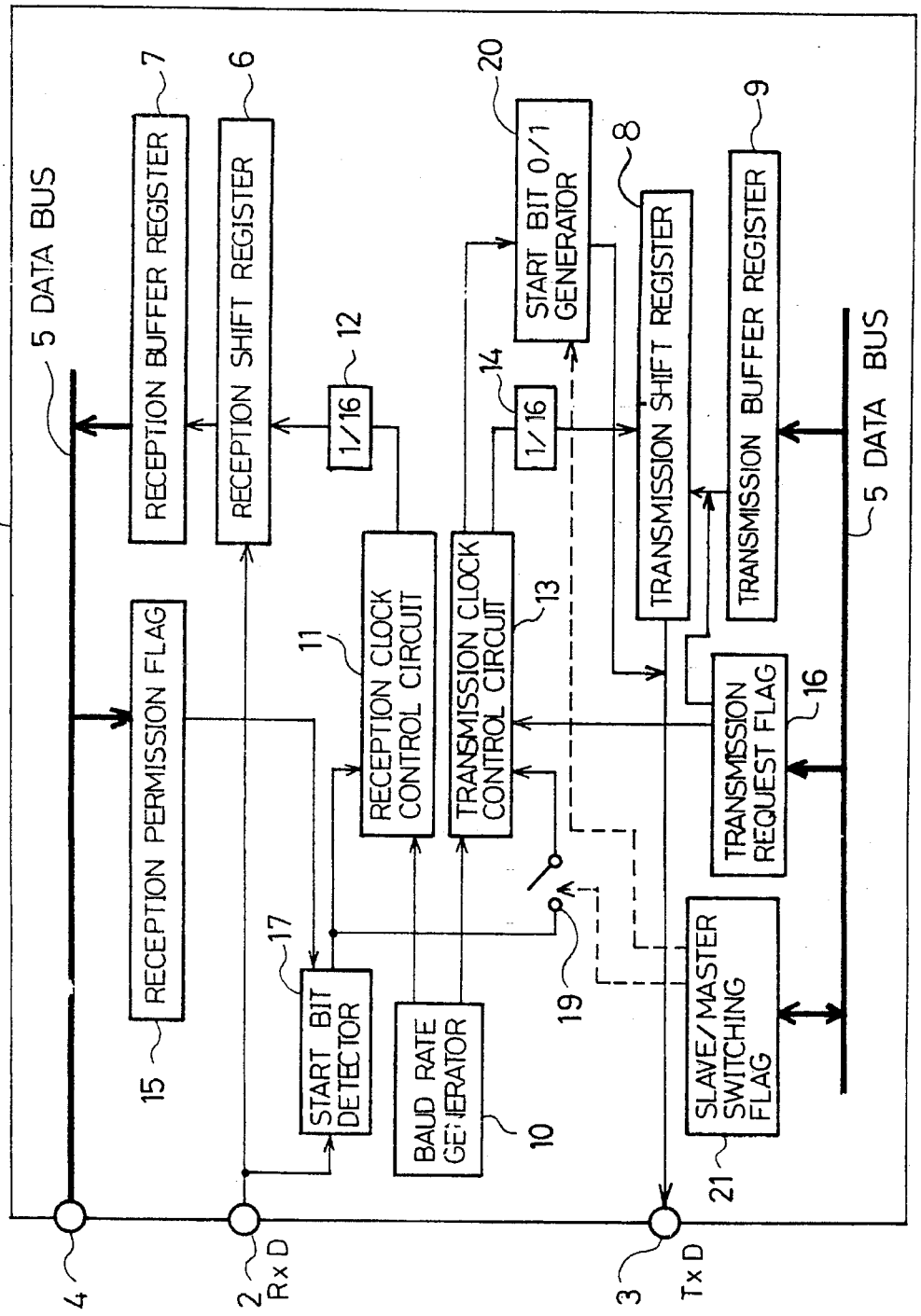
FIG. 1 is a block diagram of a two-way communication device incorporated in a microcomputer according to an embodiment of the first invention.
Figure 12:
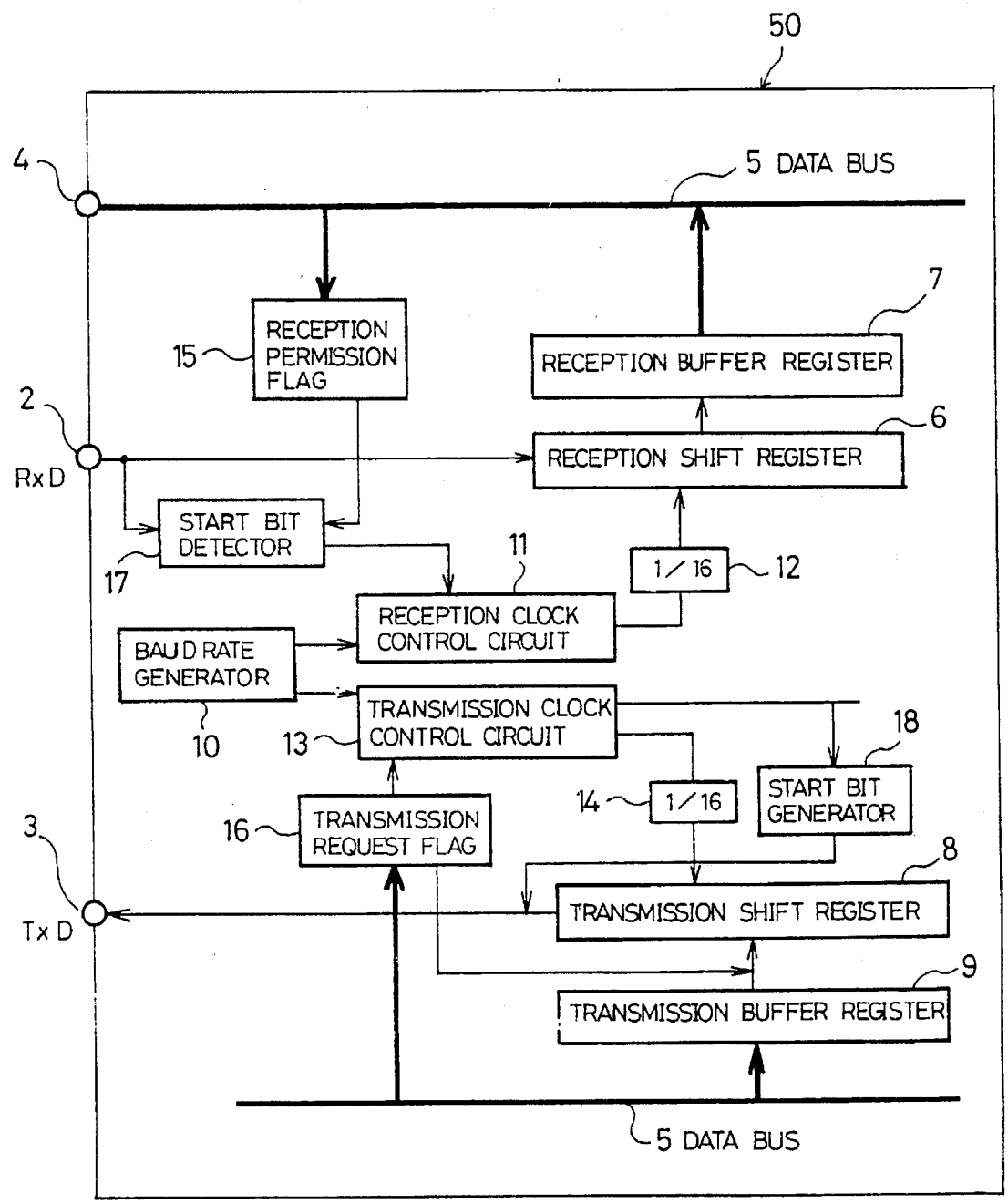
FIG. 12 is a block diagram of a two-way communication device incorporated in a prior art microcomputer.
Figure 13:
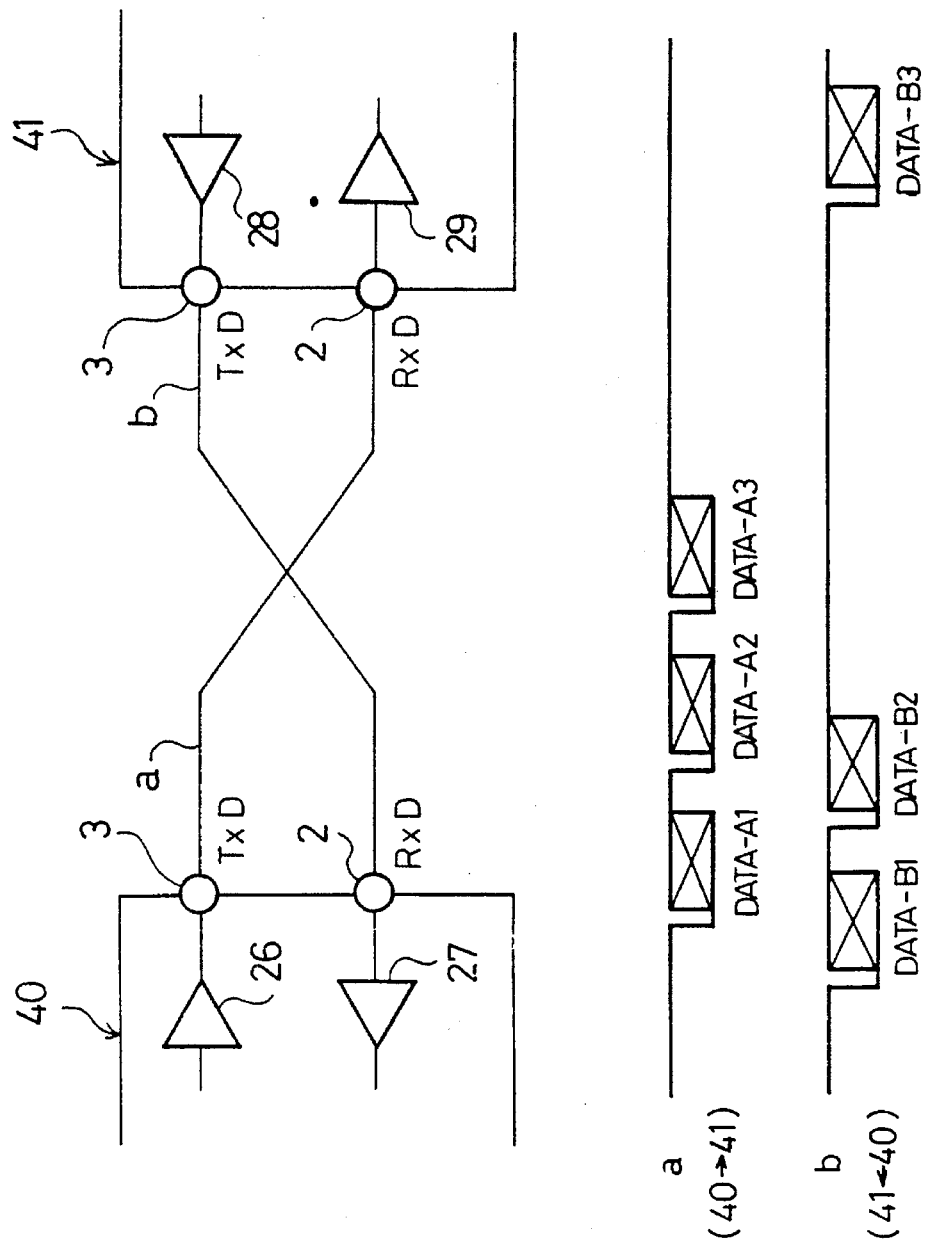
FIG. 13 is a circuit diagram of an example of the external connection of the devices of FIG. 10 for two-wire two-way serial communication.

A preferred embodiment of the present invention will be explained with reference to the drawings hereafter. FIG. 1 is a block diagram of a two-way communication device incorporated in a microcomputer according to an embodiment of the present invention. In the figure, reference numeral 1 represents the two-way communication device, a communication device incorporated in the microcomputer, 2 a communication input terminal (R×D), 3 a communication output terminal (T×D), 4 a data bus terminal, 5 a data bus, 6 a reception shift register as a reception register, 7 a reception buffer register, 8 a transmission shift register as a transmission register, 9 a transmission buffer register, 10 a baud rate generator, 11 a reception clock control circuit as a reception control circuit, 12 a divider for dividing a reception clock into $\frac{1}{16}$, 13 a transmission clock control circuit as a transmission control circuit, 14 a divider for dividing a transmission clock into $\frac{1}{16}$, 15 a reception permission flag, 16 a transmission request flag, 17 a start bit detector, 19 a switch as switching means, 20 a start bit 0/1 generator as a start bit generator, and 21 a slave/master switching flag as slave/master switch setting means. Parts denoted at 2 to 17 have the same functions as the prior art and accordingly, have the same reference numbers as the prior art (FIG. 12).

The start bit detector 17 is connected to the transmission clock control circuit 13 and the reception clock control circuit 11 through the switch 19 to detect a start bit from communication input data transmitted through the communication input terminal 2 for the synchronization of communication. The start bit detector 17 begins to monitor the start bit of the communication input terminal 2 when the reception permission flag 15 is set, and controls the operation of the reception clock control circuit 11 and the transmission clock control circuit 13 according to the result of monitoring.

One end of the switch 19 is connected to the start bit detector 17, and the other end thereof to the transmission clock control circuit 13 so that it can connect or disconnect the start bit detector 17 and the transmission clock control circuit 13 through the ON/OFF operation thereof according to a slave mode or a master mode set by the slave/master switching flag 21. In addition, the switch 19 determines whether the control of the operation of the transmission clock control circuit 13 by the start bit detector 17 is enabled or not.

The input of start bit 0/1 generator 20 is connected to the transmission clock control circuit 13 and the output thereof connected to the output communication terminal 3 so that it adds a "Low" (0) or "High" (1) start bit to communication output data outputted to the communication output terminal 3. In addition, the generator prohibits the addition of the start bit to the communication output data.

Figure 2:
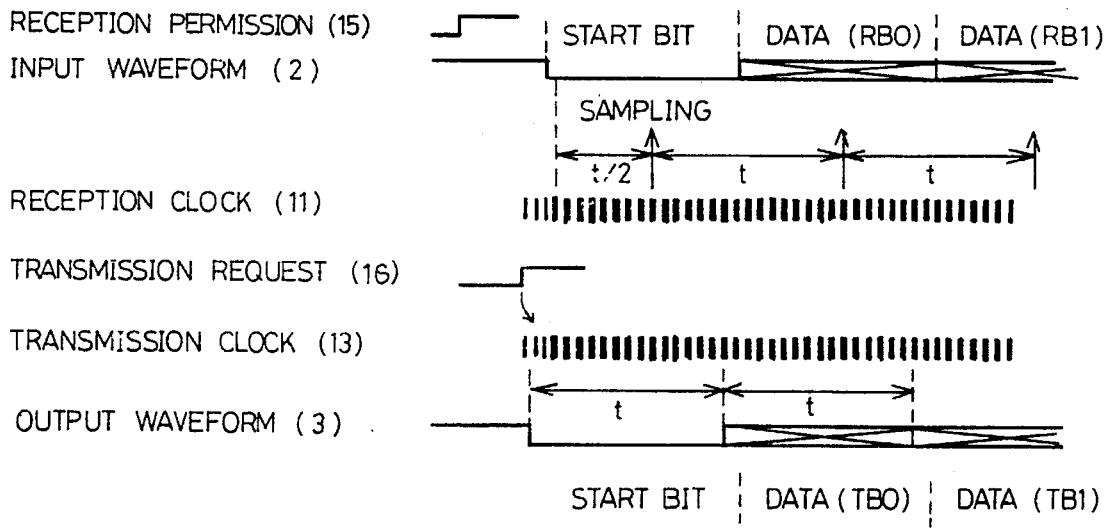
FIG. 2 shows timing charts of the operation of the communication device of FIG. 1.

When the slave/master switching flag 21 receives an instruction on a master mode or a slave mode from the unshown CPU through the data bus 5, it controls the selection of ON or OFF operation of the switch 19 according to the instructed mode, and controls the generation or prohibition of a "Low" start bit or a "High" start bit from the start bit 0/1 generator. The unshown CPU is connected to the data bus terminal 4 connected to the data bus 5. FIG. 2 shows the timing charts of the operations of the device in a slave mode and a master mode. The timing charts show a reception permission signal of the reception permission flag 15, an input waveform signal of the communication input data inputted from the communication input terminal 2, transmission and reception clock signals of the reception clock control circuit 11 and the transmission clock control circuit 13, a transmission request signal of the transmission request flag 16 and the output waveform of the communication output data outputted to the communication output terminal 3 in a slave mode and a master mode. Reference numbers in parentheses for each item of the timing charts indicate respective parts of FIG. 1. In a slave mode, when the reception permission signal of the reception permission flag 15 becomes "High", communication input data are inputted from the communication input terminal 2 in the order of start bit, data (RBO) and data (RBI). At this time, the reception clock control circuit 11 performs sampling at intervals of t/2, t and t. Thereafter, when the transmission request signal of the transmission request flag 16 becomes "High", data (TBO) and data (TB1) are outputted to the output communication terminal 3 in synchronism with the transmission clock of the transmission clock control circuit 13 after a time period of t from the start bit of the communication input data from the communication input terminal 2.

In a master mode, the reception of the communication input data is the same as in a slave mode, but for the transmission of the communication output data, when the transmission request signal of the transmission request flag 16 becomes "High", a start bit, data (TBO) and data (TB1) are outputted to the communication output terminal 3 in synchronism with the transmission clock of the transmission clock control circuit 13. Namely, at the time of transmission, the communication device outputs a start bit to its partner communication device and outputs the communication output data in synchronism of this start bit thereof.

FIG. 3 is a diagram of the operation of the device of FIG. 1 in a master mode and a slave mode. The operation of the device in a slave mode and a master mode will be explained below. That is, in a slave mode, at the time of reception, a start bit is inputted from the partner communication device, and the data bits of the communication input data RB0 and RB1 are synchronized with the start bit of the partner communication device. Also at the time of transmission, a start bit is inputted from the partner communication device, and the data bits of the communication output data TB0 and TB1 are synchronized with the start bit of the partner communication device.

In a master mode, at the time of reception, a start bit is inputted from the partner communication device, and the data bits of the communication input data are synchronized with the start bit of the partner communication device, while at the time of transmission, a start bit is outputted from the present communication device to its partner communication device, and the data bits of the communication output data are transmitted in synchronism with the start bit of the communication device. Therefore, two two-way communication devices are used, and one device is set at a master mode, and the other at a slave mode. When the communication input terminal and the communication output terminal of these devices are connected by wired ORs and a single line, single-wire two-way serial communication (single-wire half-duplex communication) is made possible. When both of the two devices are set at a master mode, and the communication input terminal and the communication output terminal of one device are cross-connected, respectively, by two lines, to the communication output terminal and the communication input terminal of the other device, two-wire two-way serial communication (two-wire full duplex communication) is made possible.

Figure 4:
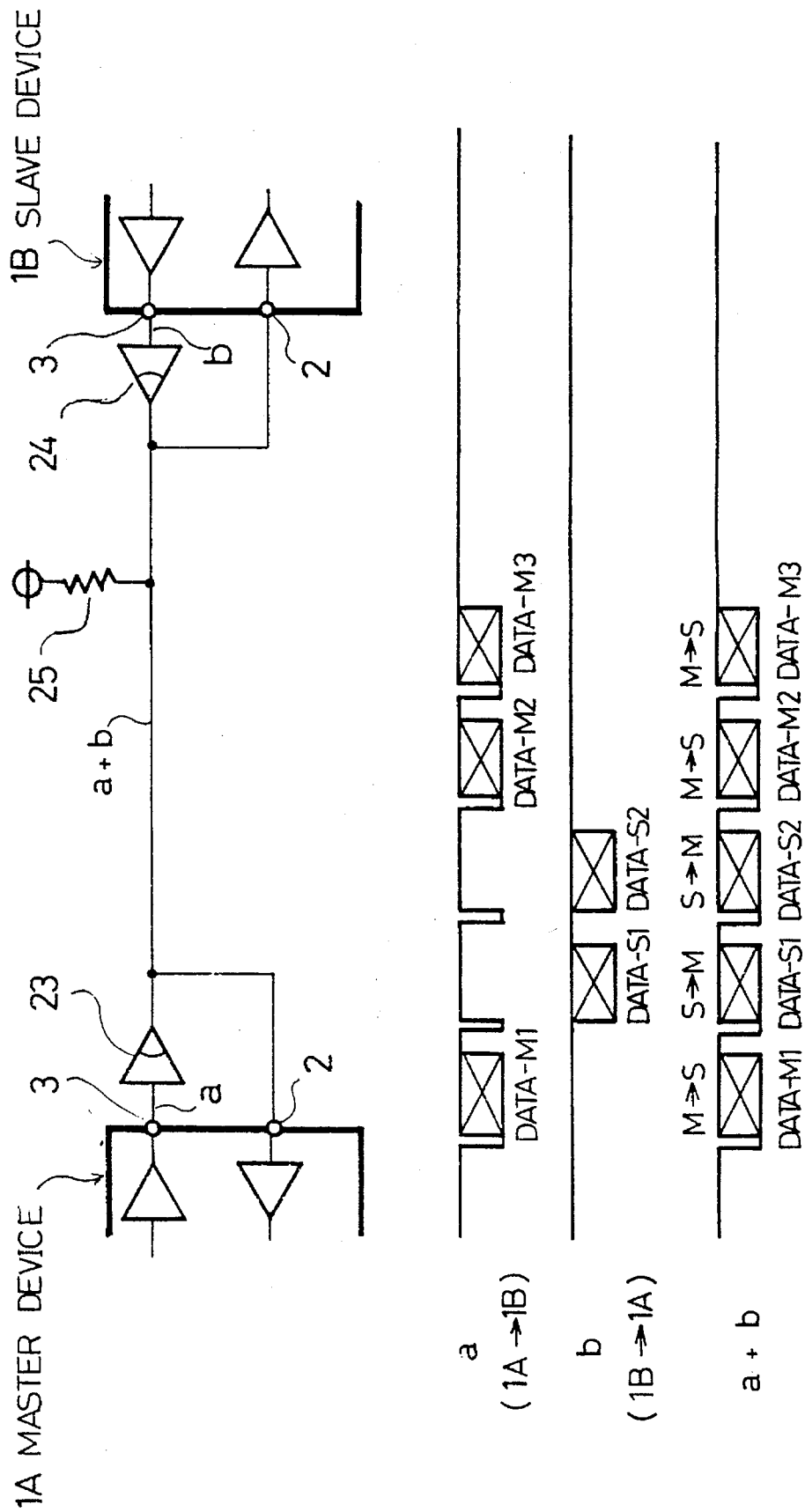
FIG. 4 is a circuit diagram of an example of the external connection of the devices of FIG. 1 for single-wire two-way serial communication.
Figure 5:
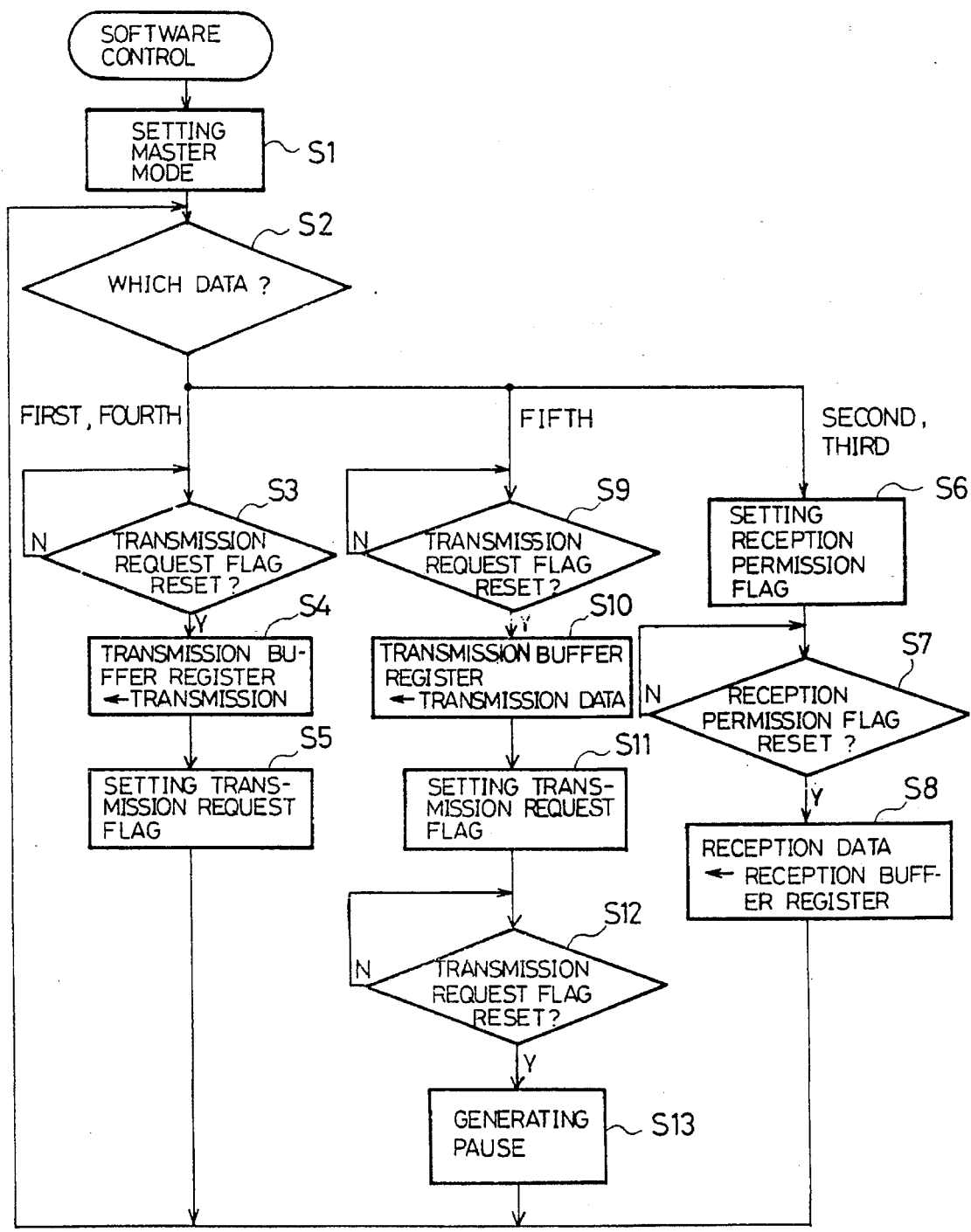
FIG. 5 is a flow chart of the operation of the device of FIG. 1 for single-wire two-way serial communication.
Figure 6:
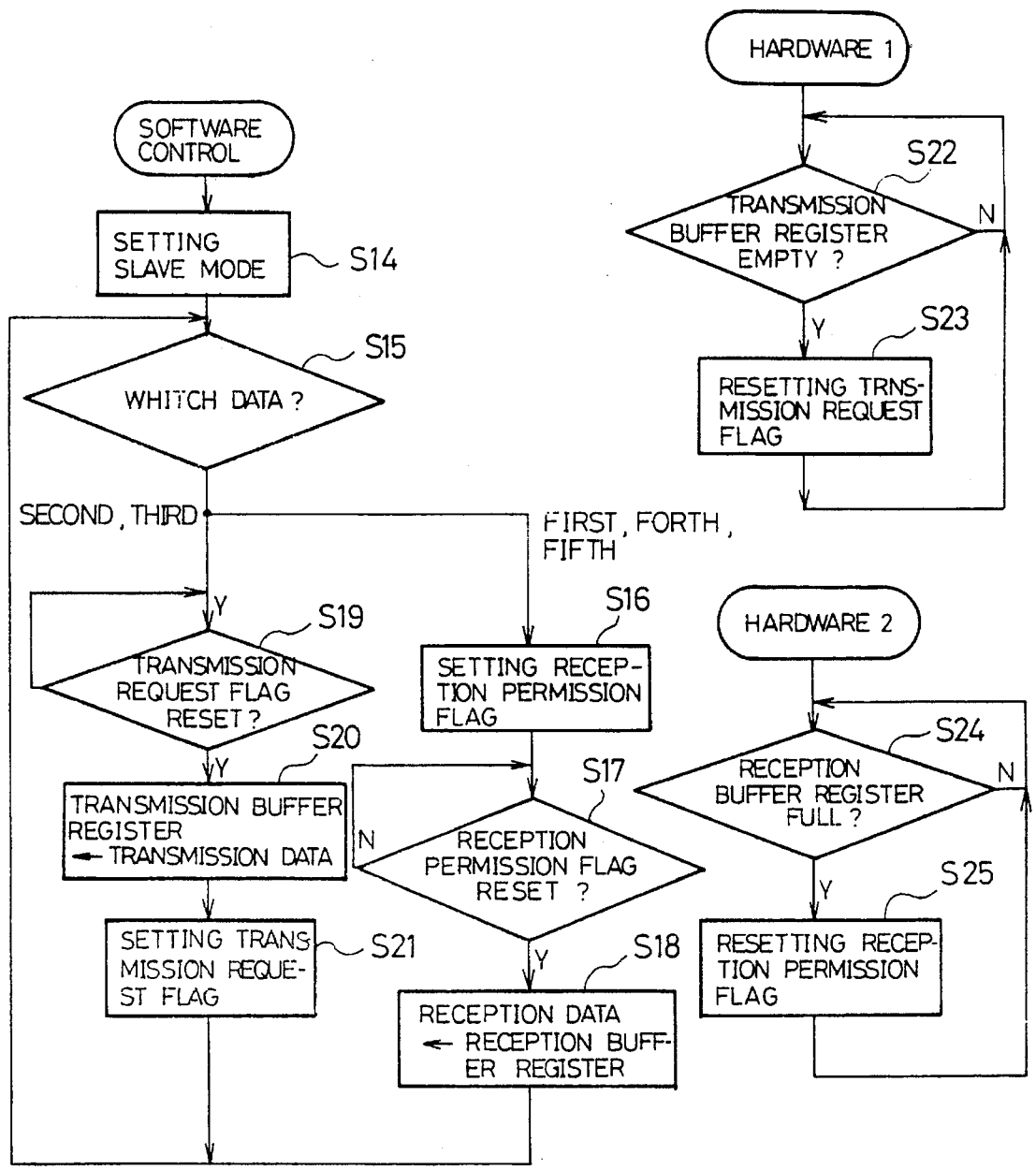
FIG. 6 is also a flow chart of the operation of the device of FIG. 5 for single-wire two-way serial communication.
Figure 7:
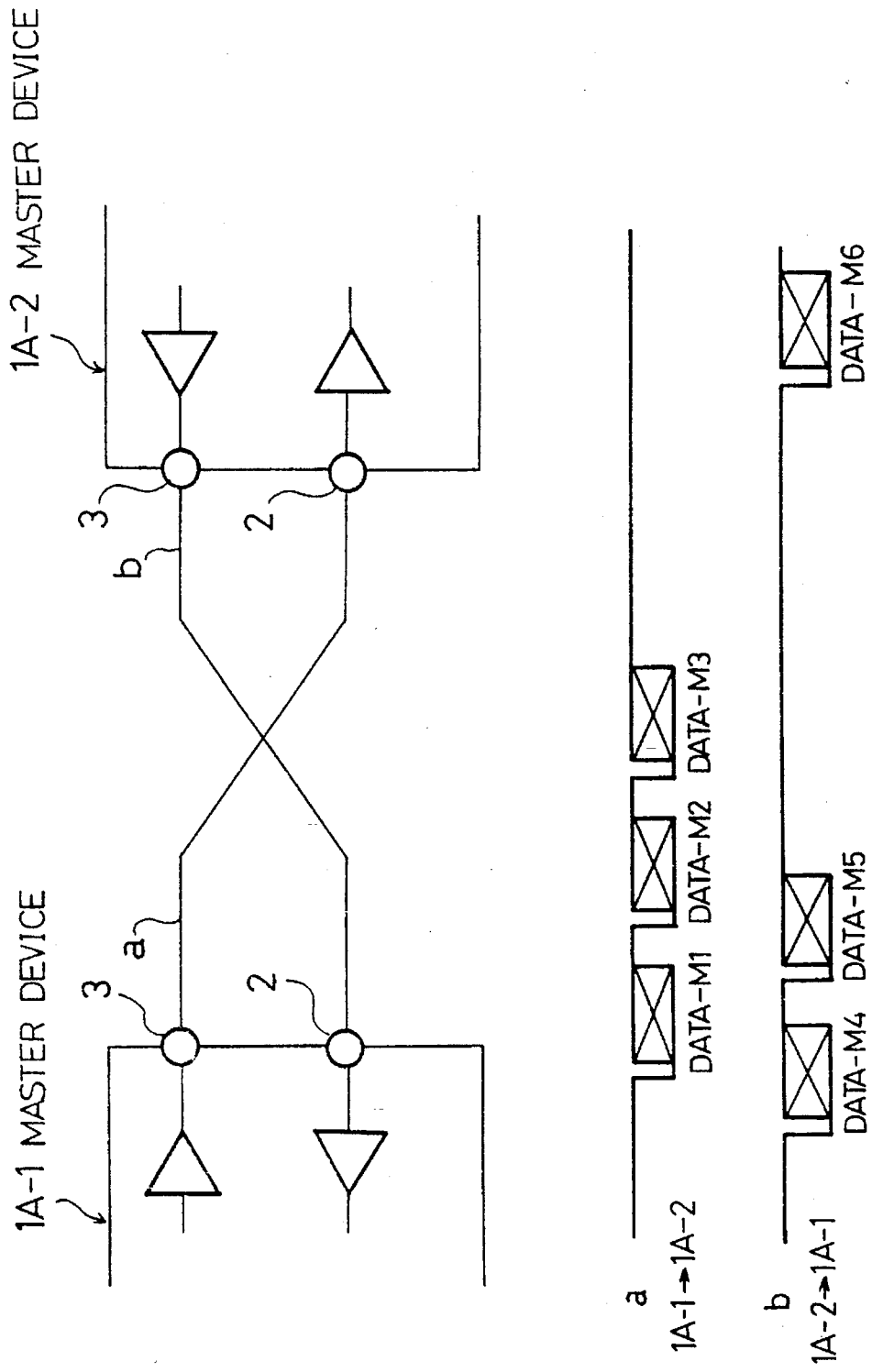
FIG. 7 is a circuit diagram of an example of the external connection of the devices of FIG. 1 for two-wire two-way serial communication.
Figure 8:
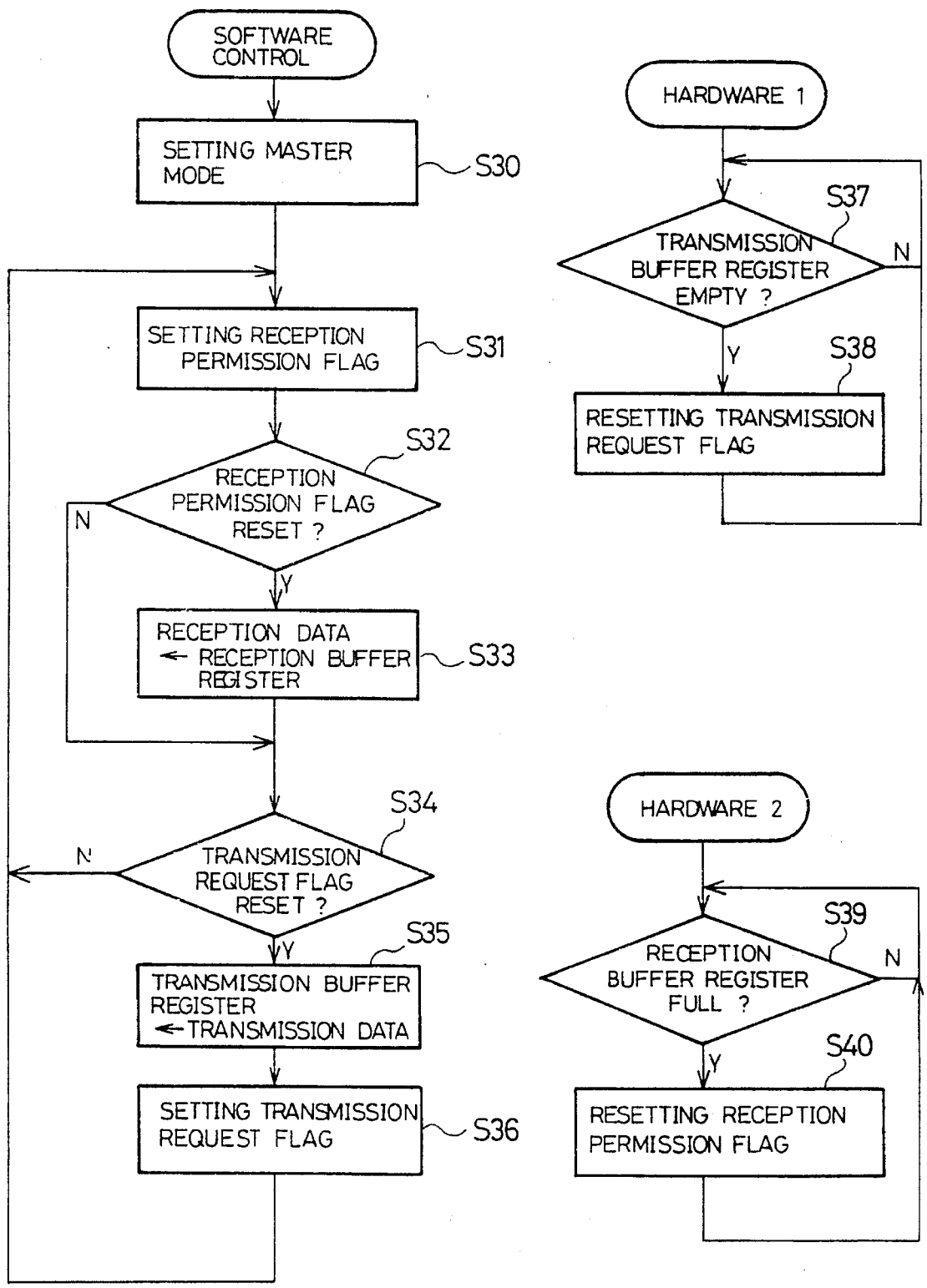
FIG. 8 is a flow chart of the operation of the device of FIG. 1 for two-wire two-way serial communication.

FIG. 4 is a circuit diagram of an example of single-wire two-way serial communication using two of the devices of FIG. 1, one of which is set at a slave mode and the other at a master mode and both connected outside by wired ORs and a single line. FIG. 5 and FIG. 6 are flow charts illustrating the control operation of a register in the device of FIG. 4. FIG. 5 is a flow chart of the two-way communication device set at a slave mode, and FIG. 6 is a flow chart of the two-way communication device set at a master mode. FIG. 7 is a circuit diagram of an example of two-wire two-way serial communication using two of the devices of FIG. 1 when both are set at a master mode and the communication input terminal and the communication output terminal of one device are cross-connected, respectively, by two lines, to the communication output terminal and the communication input terminal of the other device. FIG. 8 is a flow chart of the control operation of a register in the device of FIG. 7.

Referring to FIG. 1, and FIGS. 4 to 8, the operation of the two-way communication device for single-wire two-way serial communication and two-wire two-way serial communication will be described hereafter.

As shown in FIG. 4, for single-wire two-way communication, one of the two two-way communication devices is set at a master mode (called "master device" hereinafter), and the other at a slave mode (called "slave device" hereinafter). The communication output terminal 3 of the master device 1A is connected to the slave device and the communication input terminal 2 thereof through the output buffer 23. In the same way as the master device, the communication output terminal 3 of the slave device 1B is connected to the master device 1A and the communication input terminal 2 thereof through the output buffer 24. A single communication line connecting the master device 1A and the slave device 1B is connected to an external power source by a pull-up resistor 25. Below the circuit diagram of FIG. 4 are a signal "a" to be transmitted from the master device 1A to the slave device 1B, a signal "b" to be transmitted from the slave device 1B to the master device 1A, and a signal "a+b" over the communication line. At the time of transmission in this communication, the master device 1A outputs a start bit to synchronize the data bits of the communication output data with the start bit thereof. The slave device 1B receives and transmits communication data in synchronism with the start bit of the master device without outputting a start bit therefrom. For single-wire two-way serial communication, communication data DATA-M1, DATA-M2 and DATA-M3 are transmitted from the master device 1A to the slave device 1B at predetermined intervals, and communication data DATA-S1 and DATA-S2 are transmitted from the slave device 1B to the master device 1A at predetermined intervals. Since there is only a single communication line between the master device and the slave device, two-way communication is performed on a time-division basis. When 5 bytes of data is communicated between the master device 1A and the slave device 1B, DATA-M1 is first transmitted from the master device 1A to the slave device 1B (represented by M→S), and then DATA-S1 is transmitted from the slave device 1B to the master device 1A (represented by S→M). Likewise, DATA-S2, DATA-M2 and DATA-M3 are communicated between the master device and the slave device as third, fourth and fifth data (S→M, M→S, M→S), respectively.

The transmission and reception of communication data between the master device 1A and the slave device 1B will now be explained in conjunction with the flow charts of FIG. 1, FIG. 4, FIG. 5 and FIG. 6. In the master device 1A, the slave/master switching flag 21 is set at a master mode in advance by the unshown externally connected CPU (step S1) before the transmission and reception of the communication data are controlled by software. The CPU instructs the master device 1A to perform processing which differs according to the data in question (step S2).

First communication data (DATA-M1) and fourth data (DATA-M2) are communication output data to be transmitted from the master device 1A to the slave device 1B (M→S). The master device 1A determines whether the transmission request flag 16 is reset or not (step S3). When it is not reset (N in step S3), the device constantly monitors the resetting of the transmission request flag 16, and when set (Y in step S3), stores the communication data (DATA-M1, DATA-M4) in the transmission buffer register 9 from the data bus 5 (step S4) and resets the transmission request flag 16 (step S5).

Second and third communication data (DATA-S1, DATA-S2) are communication input data to be transmitted from the slave device 1B to the master device 1A (S→M). The master device 1A sets the reception permission flag 15 (step S6), and determines whether the reception permission flag 15 is reset or not (step S7). When it is not reset (N in step S7), it continues to monitor the reception permission flag 15, and when reset (Y in step S7), it outputs the communication input data (DATA-S1, DATA-S2) stored in the reception buffer register 7 to the data bus 5.

Fifth communication data (DATA-M3) is communication data to be transmitted from the master device 1A to the slave device 1B. The master device 1A determines whether the transmission request flag 16 is reset or not (step S9), stores the communication data (DATA-M5) to be transmitted in the transmission buffer register 9 from the data bus 5 (step S10), and sets the transmission request flag 16 (step S11). The device determines again whether the transmission request flag 16 is reset or not (step S12) and produces a pause when reset (step S13).

Meanwhile, in the slave device 1B, the switching flag 21 is set at a slave mode in advance by the CPU for controlling the slave device (step S14) before the transmission and reception of communication data are controlled by software. The CPU instructs the slave device 1B to perform processing which differs according to the data in question (step S15).

Second and third communication data (DATA-S1, DATA-S2) are communication data to be transmitted from the slave device 1B to the master device 1A (S→M), and the slave device 1B stores the transmission data (DATA-S1, DATA-S2) in the transmission buffer register 9 after determining whether the transmission request flag 16 is reset or not, and sets the transmission request flag 16 (steps S19, S20 and S21). First, fourth and fifth communication data (DATA-M1, DATA-M2, DATA-M3) are communication data to be transmitted from the master device 1A to the slave device 1B (M→S). The slave device 1B confirms that the reception permission flag 15 is reset after setting the reception permission flag 15, and stores the communication data (DATA-M1, DATA-M2, DATA-M3) in the reception buffer register 7 (steps S16, S17 and S18).

Along with the aforementioned control operation by software, a hardware (hardware 1) determines whether the communication input data is stored in the transmission buffer register 9 or not (step S22). If the register is empty (Y in step S22), the hardware resets the transmission request flag 16 (step 23) and returns to step S22. If the register is not empty (N in step S22), the hardware returns to step S22 and constantly monitors the transmission buffer register 9.

Along with the above-mentioned control operation by the hardware, another hardware (hardware 2) also determines whether the communication output data is stored in the reception buffer register 9 (step S24). If the register is full (Y in step S24), the hardware 2 resets the reception permission flag 15 (step S25) and returns to step 24. If it is not full (N in step S24), the hardware 2 returns to step S24 and constantly monitors the reception buffer register 7.

Thereafter, for two-wire two-way communication, as shown in FIG. 7, two two-way communication devices are set at a master mode (master devices). The communication output terminal 3 of a master device 1A-1 and the communication input terminal 2 of the other master device 1A-2 are connected to each other, and the communication input terminal 2 of the master device 1A-1 and the communication output terminal 3 of the master device 1A-2 are connected to each other. Communication data DATA-M1, DATA-M2, and DATA-M3 (signal "a") are transmitted from the master device 1A-1 to the master device 1A-2, and at the same time, communication data DATA-M4, DATA-M5 and DATA-M6 (signal "b") are transmitted from the master device 1A-2 to the master device A-1. At the time of transmission, the master devices 1A-1 and 1A-2 output a start bit to synchronize the data bits of the communication data with the start bit of their own.

The transmission and reception of the communication data between the master devices 1A-1 and 1A-2 will be explained with reference to FIG. 1 and FIG. 8. The slave/ master switching flags 21 of the master devices 1A-1 and 1A-2 are set at a master mode in advance by the CPU for controlling these devices (step S30). The master device 1A-1 sets the reception permission flag 15 through the control of the CPU (step S31), and determines whether the reception permission flag 15 is reset or not (step S32). When the flag is reset (Y in step S32), the master device 1A-1 outputs the communication input data DATA-M1, DATA-M2 and DATA-M3 received from the master device 1A-2 and stored in the reception buffer register 7 to the data bus 5 (step S33). When it is not reset (N in step S32), the device goes to the next step S34. In step S34, the device 1A-1 determines whether the transmission request flag 16 is reset or not (step S34). When it is reset (Y in step S34), the device stores DATA-M1, DATA-M2 and DATA-M3 to be transmitted therefrom in the transmission buffer register 9 from the data bus 5, and sets the transmission request flag 16 (steps S35 and S36). When it is not reset (N in step S34), the device returns to step S31. Meanwhile, the hardware (hardware 1) determines whether the communication output data is stored in the transmission buffer register 9 or not (step S37). When the register is empty (Y in step S37), the hardware resets the transmission request flag 16 (step S38) and returns to S37, while when it is not empty (N in step S37), the hardware returns to S37 and constantly monitors the transmission buffer register 7.

Along with the above-mentioned control operation by the hardware, another hardware (hardware 2) also determines whether the communication input data is stored in the reception buffer register 7 or not (step S39). When the register is full (Y in step S39), the hardware 2 resets the reception permission flag 15 (step S40), and returns to S39, while when it is not full (N in step S39), the hardware 2 returns to S39 and constantly monitors the reception buffer register 7.

Next, the single-wire two-way serial communication of the communication data DATA-M1 (M→S) and DATA-S1 (S→M) explained in conjunction with FIG. 4 will be described in more detail with reference to FIG. 1. The first transmission data DATA-M1 is stored in the transmission buffer register 9 of the master device 1A from the data bus 5, and the transmission request flag 16 and the reception permission flag 15 are set from the data bus 5. Meanwhile, all "High" data is stored in the transmission buffer register 9 of the slave device 1B through the data bus 5 without disturbing signals over the single communication line since the first data period is for transmission from the master device 1A to the slave device 1B. Thereafter, the transmission request flag 16 and the reception permission flag 15 of the slave device 1B are set from the data bus 5.

When the transmission request flag 16 of the master device 1A is set, the communication data DATA-M1 of the transmission buffer register 9 is transferred to the transmission shift register 8. The transmission clock control circuit 13 supplies a clock generated by the baud rate generator 10 to the start bit 0/1 generator 20 and the transmission clock divider 14. At this time, since the slave mode/master mode switching flag 21 is set at a master mode, the switch 19 is OFF. That is, the control of the transmission control circuit 13 by the start bit detector 17 is disabled. Therefore, the transmission clock control circuit 13 is made operable only by the transmission request flag 16. The start bit 0/1 generator 20 of the master device 1A outputs a "Low" (0) start bit to the communication output terminal 3 during a certain period of time since the slave mode/master mode switching flag 21 is set at a master mode. Afterwards, the transmission clock divider 14 outputs a shift clock to the transmission shift register 8, and the transmission data DATA-M1 is outputted to the transmission output terminal 3. After the transmission data DATA-M1 is completely transmitted, the transmission request flag 16 is reset.

Meanwhile, the reception permission flag 15 of the slave device 1B is set, the start bit detector 17 waits until the communication input terminal 2 is at the "Low" level. The "Low" start bit is outputted to the communication line through the above-mentioned operation of the master device 1A. The communication input terminal 2 of the slave device 1B is at the "Low" level due to the characteristic of the wired OR communication line. Then, the start bit detector 17 of the slave device operates to enable the operation of the reception clock control circuit 11 and the transmission clock control circuit 13. At this time, since the slave mode/master mode switching flag 21 is set at a slave mode, the switch 19 is on. That is, the control of the transmission clock control circuit 13 by the start bit detector 17 is enabled. Therefore, the transmission clock control circuit 13 is operated by the AND control of the transmission request flag 16 and the start bit detector 17. In this case, as the transmission request flag 16 is already set, the transmission clock control circuit 13 is on stand-by until the start bit is detected (start of monitoring).

The reception clock control circuit 11 allows the reception clock divider 12 to divide a clock generated by the baud rate generator 10 and input it into the reception shift register 6 as a shift clock. Then, the reception shift register 6 stores the first communication data DATA-M1 transmitted from the master device through the communication input terminal 2. After storing the communication data DATA-M1, the contents of the data stored in the reception shift register 6 are transferred to the reception buffer register 7 and accessible through the data bus 5. At this time, the reception permission flag 15 is reset.

Meanwhile, when the start big detector 17 detects the "Low" start bit, the transmission clock control circuit 13 begins to operate so that the a clock generated by the baud rate generator 10 is supplied to the start bit 0/1 generator 20 and the transmission clock divider 14. The start bit 0/1 generator 20 outputs a "High" start bit to the communication output terminal 3 for a certain period of time because the slave mode/master mode switching flag 21 is set at a slave mode. Thereafter, the transmission clock divider 14 outputs a shift clock to the transmission shift register 8, and the communication data is outputted to the communication output terminal 3. At this time, the transmission request flag 16 is reset. The signal outputted from the slave device 1B to the communication line does not affect the communication data transmitted by the master device 1A due to the wired OR characteristic of the communication line since both of the start bit and the communication data to be transmitted are "High" (1).

The reception operation of the master device during communication will be described next. The reception permission flag 15 of the master device allows the start bit detector 17 to start the monitoring of the communication input terminal 2. The communication input terminal 2 is at the "Low" level due to a "Low" start bit outputted from the communication output terminal 3 of the master device, and the start bit detector 17 activates the transmission clock control circuit 13 and the reception clock control circuit 11. However, as described above, the switch 19 is off because the slave mode/master mode switching flag 21 is set at a master mode, and accordingly, the transmission clock control circuit 13 is not controlled by the start bit detector 17. The reception clock control circuit 11 provides a clock generated by the baud rate generator 10 to the reception clock divider 12 which further provides a shift clock to the reception shift register 6. The communication data DATA-M1 inputted into the communication input terminal 2 and outputted by the master device 1A is stored in the reception shift register 6. After the completion of the storage of the communication data DATA-M1, the contents of the data stored in the reception shift register 6 are transferred to the reception buffer register 7 and accessible from the data bus 5, and the reception permission flag 15 is reset.

Next, the communication of the second communication data DATA-S1 (S→M) will be explained. The communication data DATA-S1 is stored in the transmission buffer register 9 of the slave device 1B from the CPU through the data bus 5, and the transmission request flag 16 and the reception request flag 15 are set through the data bus 5. Meanwhile, all "High" data are stored in the transmission buffer register 9 of the master device 1A through the data bus 5, and the transmission request flag 16 and the reception permission flag 15 are set. The operation after this is performed in the same manner as the first data DATA-M1, but the communication data is outputted from the communication output terminal 3 of the slave device.

In this case, as the slave mode/master mode switching flag 21 of the slave device 1B is set at a slave mode, the switch 19 is on. That is, the operation of the transmission clock control circuit 13 is performed through the AND control of the output of the start bit detector 17 and the output of the transmission request flag 16. The start bit 0/1 generator 20 generates a "High" (1) start bit. Therefore, the communication data DATA-S1 outputted from the communication output terminal 3 is synchronized with a "Low" start bit outputted from the master device 1A, and outputted immediately after the "High" start bit from the communication output terminal 3 of the slave device. The start bit over the communication line appears as a "Low" signal from the master device due to the wired OR characteristic. Since data outputted from the master device is all "High" (1), the communication data DATA-S1 outputted from the slave device 1B appears as data over the communication line due to the wired OR characteristic Third, fourth and fifth data, DATA-S2 (S→M), DATA-M2 (M→S), DATA-M3 (M→S), are communicated in the same way as described above. Half-duplex communication of five items of data is performed over a single communication line. The internal operation of the two-way communication device in case of two-wire two-way communication is the same as in case of single-wire two-way communication. Therefore, detailed description of the internal operation of the device is omitted.

Figure 9:
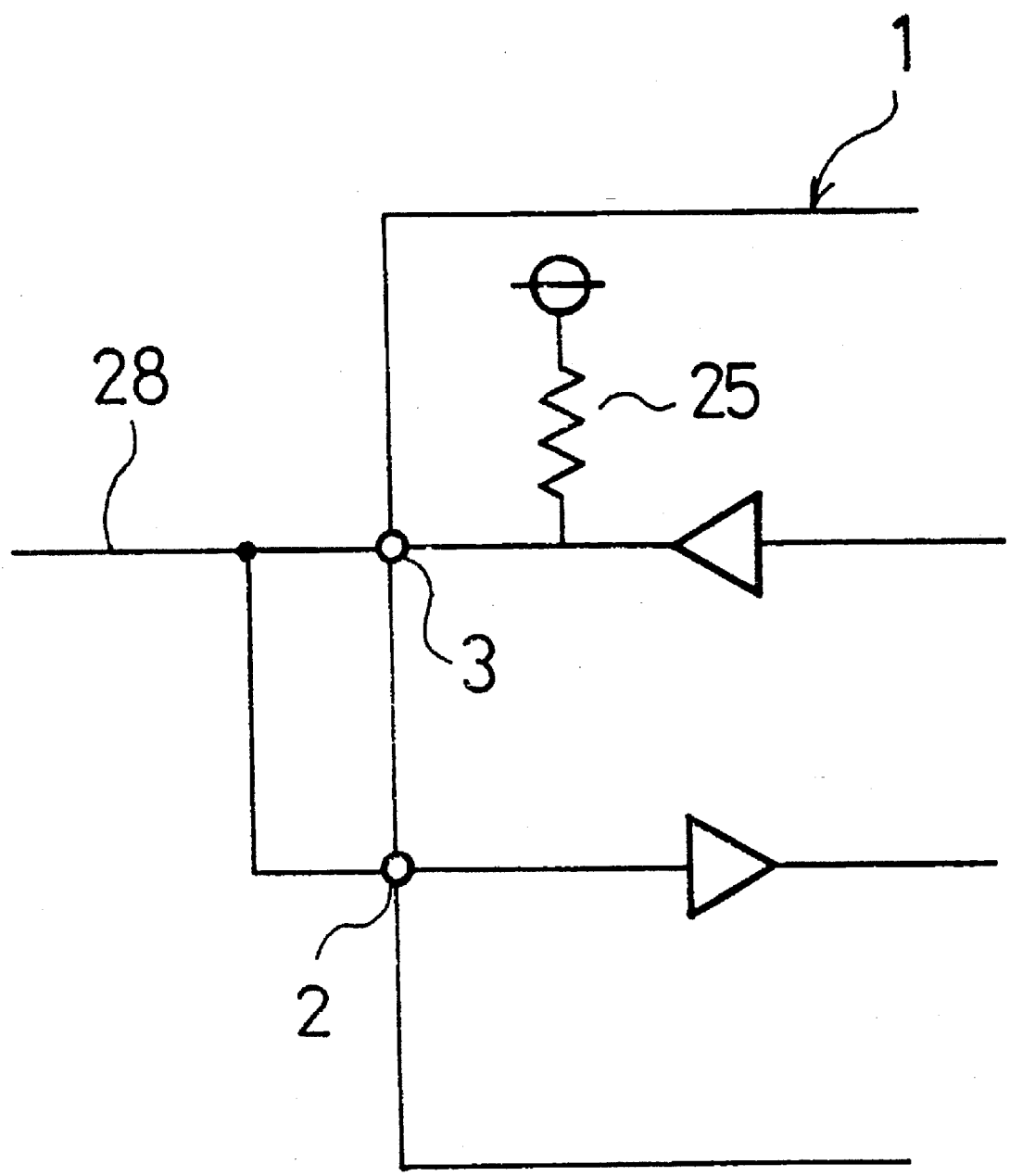
FIG. 9 is a circuit diagram of a two-way communication device according to an embodiment of the second invention.

FIG. 9 is a circuit diagram of a two-way communication device incorporated in a microcomputer according to an embodiment of the second invention. Since the communication line is wired OR in the embodiment of the first invention, an open collector output type buffer and the pull-up resistor 25 are attached to the outside of this two-way communication device. However, in the embodiment of the second invention, these are attached to the inside of the two-way communication device. In other words, the communication output terminal 3 is made an open collector type output, or is connected to the power source in the communication device by the pull-up resistor 25.

Figure 10:
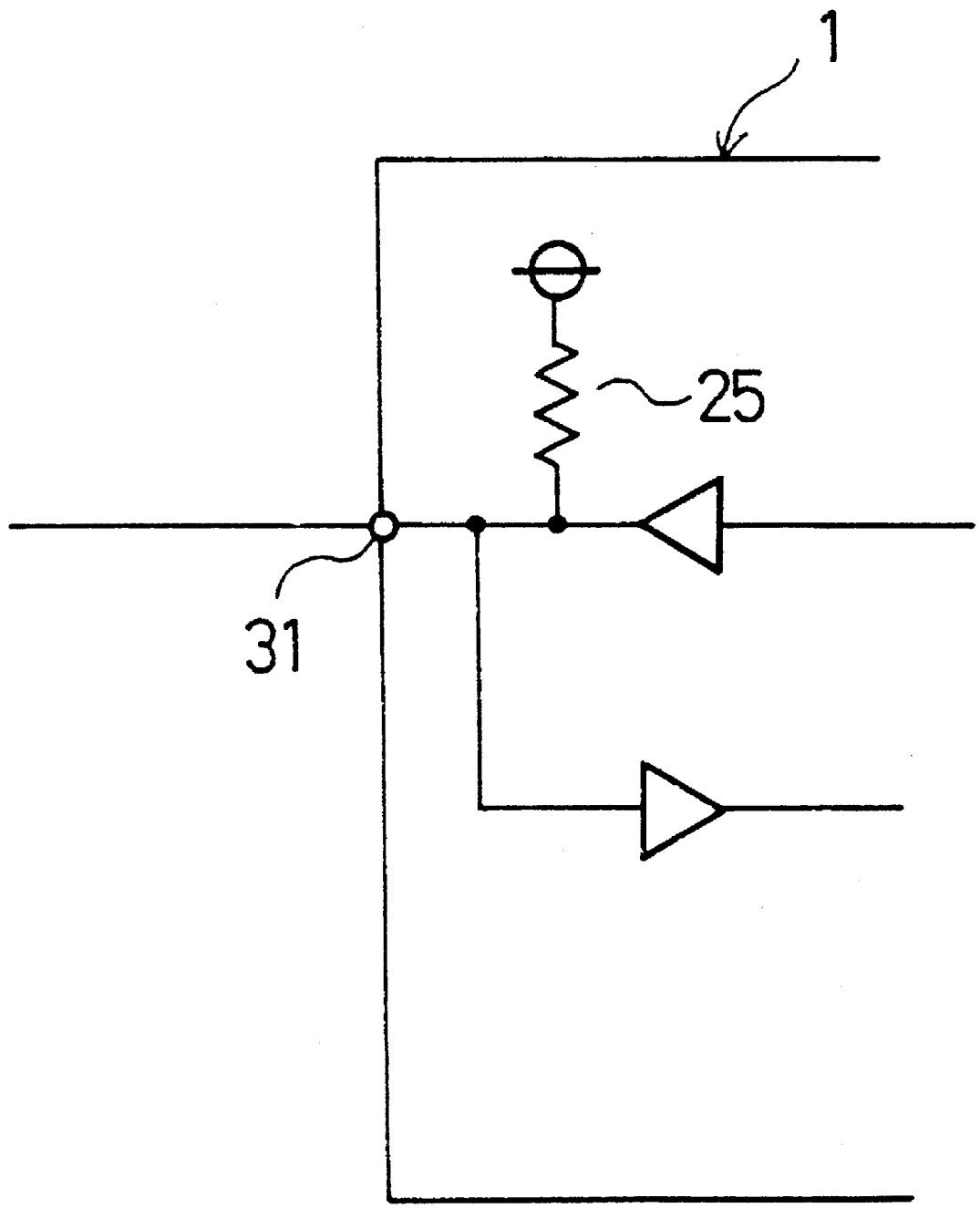
FIG. 10 is a circuit diagram of a two-way communication device according to an embodiment of the third invention.

FIG. 10 is a circuit diagram of a two-way communication device incorporated in a microcomputer according to an embodiment of the third invention. Unlike FIG. 9, the communication output terminal 3 and the communication input terminal 2 are not connected outside the two-way communication device 1, but inside the device, and outside communication is performed through a single communication input/output terminal 31.

Figure 11:
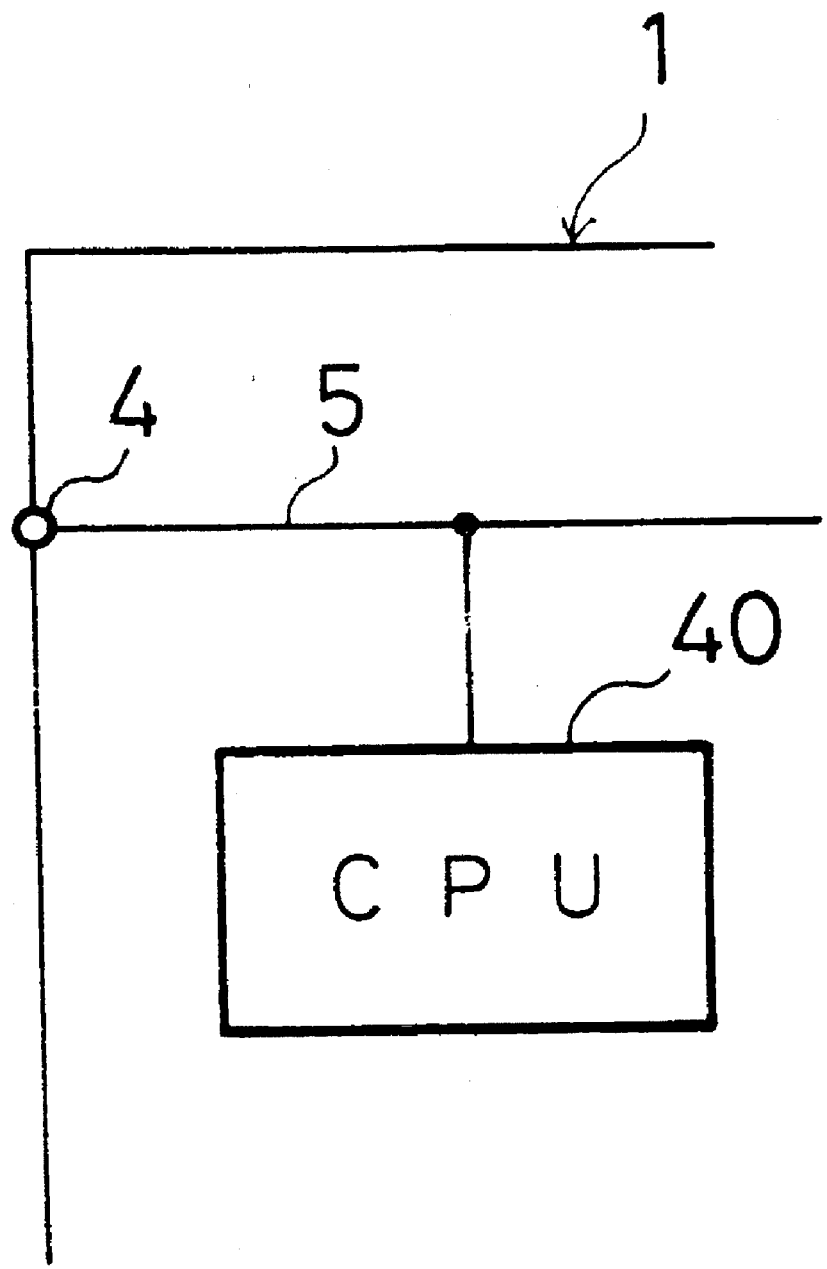
FIG. 11 is a circuit diagram of a two-way communication device according to an embodiment of the fourth invention.

FIG. 11 is a circuit diagram of a two-way communication device incorporated in a microcomputer according to an embodiment of the fourth invention. In the embodiment of the first invention, an external data bus is provided outside the two-way communication device with the data bus terminal 4 therebetween for interface with an external CPU. However, in the embodiment of the fourth invention, a CPU, a ROM and a RAM are incorporated in the two-way communication device and connected to the internal data bus 5 to operate the microcomputer as a one-chip MPU.

As described above, according to the first invention, since the microcomputer comprises a start bit generator for adding a start bit to communication output data outputted to a communication output terminal or prohibiting it, switching means for connecting or disconnecting the start bit detector and a transmission control circuit, slave/master switch setting means for setting the switching means and start bit generator according to a master mode or a slave mode specified by a CPU, there is the advantage that two-wire two-way serial communication or single-wire two-way serial communication can be easily switched and effected with a small number of built-in hardwares according to the user's specifications. In addition, as the control of the reception clock generator circuit by a start bit and the switch of the start bit between a "High" level and a "Low" level are effected by shift between a slave mode and a master mode, there are other advantages that single-wire two-way serial communication can be effected and wiring costs can be reduced. Furthermore, two-wire two-way serial communication is made possible by setting the communication device at a master mode, thus providing general applicability to the device.

According to the second invention, since the communication output terminal is made an open collector output, or is connected to a power source within the communication device by a pull-up resistor, there is the advantage that it is not necessary to provide parts such as the pull-up resistor connected to the communication line outside the communication device in addition to the advantages of the first invention.

Moreover, according to the third invention, since there is provided a single communication input/output terminal which is the combination of the communication input terminal and the communication output terminal, there is the advantage that wiring costs can be reduced and the communication input/output circuit simplified in addition to the advantages of the first invention.

Furthermore, according to the fourth invention, since the CPU is connected to the data bus within the communication device, there is the advantage that the microcomputer can be operated as a one-chip MPU in addition to the advantages of the first, second and third inventions. In addition, a data bus interface with external parts of the communication device incorporated in the microcomputer can be omitted.

What is claimed is:

1. A microcomputer incorporating a communication device controlled by a CPU connected to an external data bus comprising (1) a reception control circuit for controlling a reception register for storing communication input data from a communication input port, (2) a transmission control circuit for controlling a transmission register for storing and outputting communication output data to a communication output port, and (3) a start bit detector for detecting a start bit from the communication input data inputted from the communication input port to synchronize communication, characterized in that the microcomputer comprises a start bit generator for either adding a start bit to the communication output data outputted to the communication output port to synchronize communication or for prohibiting the addition of the start bit, switching means for connecting or disconnecting said start bit detector and said transmission control circuit, slave/master switch setting means for setting said switching means and said start bit generator according to a master mode or a slave mode specified by said CPU;

when said slave/master switch setting means is set at a master mode, said start bit generator is permitted to generate a start bit and said start bit detector is prohibited from synchronizing operation of said transmission control circuit to an externally received start bit and is permitted to synchronize operation of said reception control circuit to said start bit generated by said start bit generator, while when said slave/master switch setting means is set at a slave mode, said start bit detector is permitted to synchronize operation of said transmission control circuit and said reception control circuit to an externally received start bit, and at the same time, said start bit generator is prohibited from generating a start bit to the communication output port, whereby when said microcomputer is set to slave mode it may cooperate with another similar microcomputer set to master mode to exchange data using single-wire half-duplex serial communication, and when said microcomputer is set to a master mode it may cooperate to exchange data with another similar microcomputer set to a slave mode using single-wire half-duplex serial communication or it may cooperate to exchange data with another similar microcomputer set to a master mode using two-wire full-duplex serial communication.

2. A microcomputer incorporating a communication device according to claim 1, wherein said start bit generator is a start bit 0/1 generator for adding a "0" or "1" start bit to the communication output data outputted to the communication output port or prohibiting the addition of the start bit.

3. A microcomputer incorporating a communication device according to claim 1, wherein said slave/master switch setting means consists of a slave/master switching flag.

4. A microcomputer incorporating a communication device according to claim 1, wherein the communication output port is connected to a power source within the communication device by a pull-up resistor.

5. A microcomputer incorporating a communication device according to claim 4, wherein the communication input port and the communication output port are connected within the communication device, and to an externally accessible communication input/output terminal of the communication device.

6. A microcomputer incorporating a communication device according to claim 1, wherein said CPU for controlling said switching means and said slave/master switch setting means is connected to a data bus within the communication device.

\* \* \* \* \*